(12) United States Patent
De Lucia

(10) Patent No.: US 7,204,109 B1
(45) Date of Patent: Apr. 17, 2007

(54) UNIVERSAL PORTABLE GAS PEDAL LOCKING DEVICE FOR VEHICLES

(76) Inventor: Achille A. De Lucia, 1565-81 St., Brooklyn, NY (US) 11228

( * ) Notice: Subject to any disclaimer, the term of this patent is extended or adjusted under 35 U.S.C. 154(b) by 0 days.

(21) Appl. No.: 11/456,202

(22) Filed: Jul. 8, 2006

(51) Int. Cl.
*F16H 57/00* (2006.01)
(52) U.S. Cl. .............................. 70/202; 70/209; 70/14
(58) Field of Classification Search .................... 70/14, 70/201–204, 232, 237, 209–212
See application file for complete search history.

(56) References Cited

U.S. PATENT DOCUMENTS

| | | | | |
|---|---|---|---|---|
| 918,662 A | * | 4/1909 | Drucker | 292/37 |
| 1,264,814 A | * | 4/1918 | Kornstein | 70/116 |
| 1,977,853 A | * | 10/1934 | Kemp | 70/118 |
| 4,493,198 A | * | 1/1985 | Brown | 70/203 |
| 4,620,718 A | * | 11/1986 | Mickelson | 280/507 |
| 4,660,397 A | * | 4/1987 | Girimont | 70/456 R |
| 5,020,390 A | * | 6/1991 | Chang | 74/608 |
| 5,147,096 A | * | 9/1992 | Rogers | 280/507 |
| 5,359,868 A | | 11/1994 | Villani | |
| 5,361,613 A | * | 11/1994 | Fort et al. | 70/247 |
| 5,537,846 A | | 7/1996 | Simon | |
| 5,555,755 A | * | 9/1996 | Padrin | 70/247 |
| 5,715,710 A | | 2/1998 | DeLucia et al. | |
| 5,845,521 A | * | 12/1998 | Najera | 70/56 |
| 5,855,128 A | * | 1/1999 | Voiculescu | 70/209 |
| 5,873,271 A | * | 2/1999 | Smith | 70/58 |
| 5,873,275 A | * | 2/1999 | Lukich | 70/226 |
| 5,906,121 A | * | 5/1999 | Mankarious | 70/199 |
| 5,979,197 A | * | 11/1999 | Mellini et al. | 70/199 |
| 6,085,559 A | * | 7/2000 | Jarrett | 70/202 |
| 6,094,949 A | * | 8/2000 | Lagerberg et al. | 70/14 |
| 6,131,424 A | * | 10/2000 | Dixon | 70/198 |
| 6,244,614 B1 | * | 6/2001 | Bonvillain et al. | 280/507 |
| 6,662,894 B2 | * | 12/2003 | Chantrasuwan et al. | 180/287 |
| 6,766,674 B2 | * | 7/2004 | Simon | 70/202 |
| 6,792,780 B1 | | 9/2004 | DeLucia | |
| 2004/0040351 A1 | * | 3/2004 | Alcott | 70/63 |
| 2004/0163432 A1 | * | 8/2004 | Atthaprasith | 70/202 |
| 2004/0261476 A1 | * | 12/2004 | Dix | 70/203 |

* cited by examiner

*Primary Examiner*—Suzanne Dino Barrett
(74) *Attorney, Agent, or Firm*—Robert W. J. Usher

(57) ABSTRACT

A portable, universal, anti-theft device having inner and outer tubular housings mounted together telescopically. Both housings have open front, axial ends and the rear end of the outer housing is closed. Opposite wall portions of inner and outer housings are formed with pairs of intersecting camming slots receiving locking pins. A locking handle on one housing can move the housings in opposite axial directions to cam the locking pins between an open, gas pedal inserting position, in which the locking pins are cammed apart, permitting the open front end of the housing assembly to be advanced, in enclosing relation, over the gas pedal by the gas pedal passing between and behind the pins and, a closed, gas pedal immobilizing and concealing position in which the pins are cammed together engaging in front of the gas pedal, immobilizing and concealing the gas pedal wholly within the housing assembly.

11 Claims, 2 Drawing Sheets

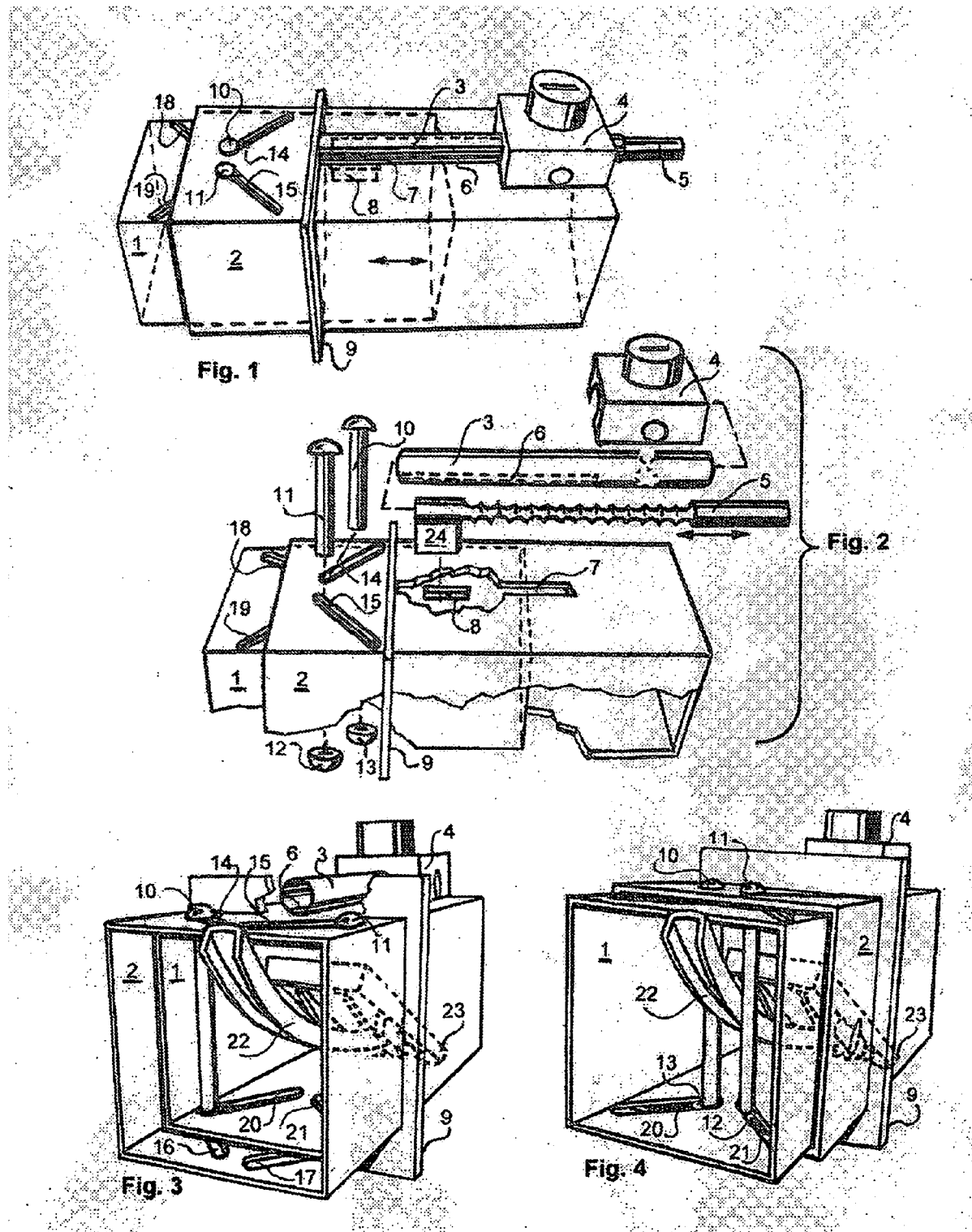

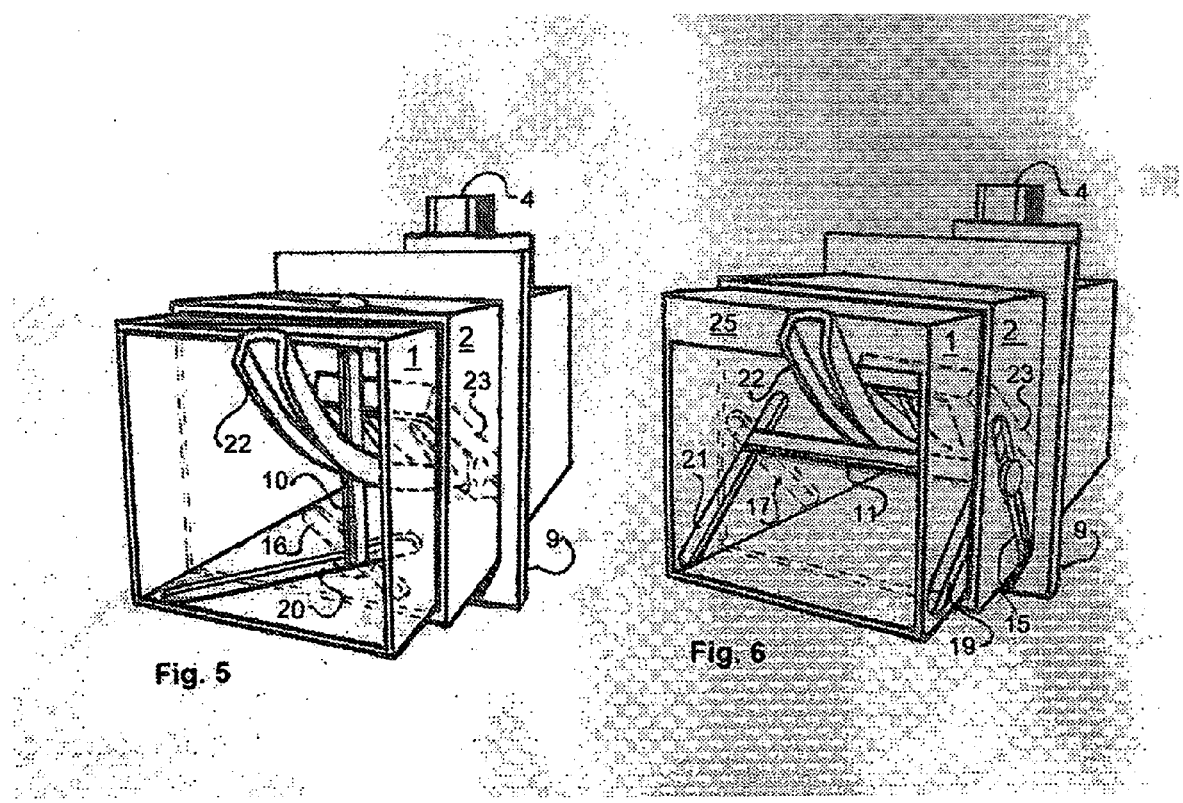

UNIVERSAL PORTABLE GAS PEDAL LOCKING DEVICE FOR VEHICLES

FIELD OF THE INVENTION

The invention relates to a universal, portable gas pedal locking device for motor vehicles.

BACKGROUND OF THE INVENTION

Numerous anti-theft, portable automobile pedal locking devices for motor vehicles have been proposed over many years.

Most of these prior proposals have been directed to locking the brake pedal, including, for example, U.S. Pat. No. 5,715,710, issued 1998 to the present inventor, which comprises first and second shafts which can be adjusted axially to engage the vehicle floor as a stand-off and hooked under the brake pedal shaft, respectively, and then locked together to prevent depression of the brake pedal.

In a further proposal taught in U.S. Pat. No. 5,537,846 issued 1996 by to Simon, the first and second axially adjustable shafts carry clamping plates which engage together over and under the brake pedal itself by manually tightening a screw for firm clasping.

In another proposal taught by U.S. Pat. No. 6,792,780, issued Sep. 21, 2004 to the present inventor, one shaft carries a wedging member which wedges the brake pedal into a claw carried by another shaft to help accommodate variations in brake pedal configuration and position.

However, these are relatively bulky devices and much of the brake pedal engaging mechanism remains visible for potential interference by a thief.

An alternative approach U.S. Pat. No. 5,359,868, issued 1994 to Villani, teaches substantially complete enclosure of a gas pedal by a box on a stand. Upper and lower halves of the box are pivoted at one end for movement together, clam shell fashion to enclose the gas pedal. However, a disadvantage of this approach is that variations in size of gas pedal and distance above the floor of the automobile cannot be accommodated and several different sizes would therefore be required for different automobiles.

SUMMARY OF THE INVENTION

It is an object of the invention, to provide a portable anti-theft device for a vehicle which device has the advantages of universal application and easy transfer between conventional vehicles of different types; is relatively simple and easy to install and, yet which is secure in operation, in particular, not placing reliance on the strength of vulnerable and exposed parts of the vehicle such as the rim of the steering wheel, which may be severed, while leaving the vehicle in potentially drivable condition.

Another object of the invention is to provide a portable, universal (within limits), anti-theft device for a vehicle which immobilizes and encloses a vehicle component necessarily movable for normal vehicle operation substantially completely so that points of locking engagement between the device and a vehicle component are concealed from normal view.

According to one aspect of the invention, a portable, universal, anti-theft device comprises a first, inner, tubular housing part and a second, outer, tubular housing part mounted together in telescopic relation;

each tubular housing part having an open front axial end and upper and lower, opposite wall portions extending between front and rear axial ends thereof;

the upper and lower wall portions of one said first and second housing parts being formed with vertically aligned pairs of rearwardly convergent cam slots;

and the upper and lower wall portions of another of said first and second housing parts being formed with vertically aligned pairs of forwardly convergent cam slots with each pair of slots having a first individual slot and a second individual slot so that first individual slots of both pairs on the one housing part cross first individual slots of both pairs on said another housing part and second individual slots of both pairs of the one housing part cross second individual slots of both pairs on said another housing part;

a first cam following locking pin and a second cam following locking pin passing through all said first individual slots where they cross and all of said second individual slots where they cross;

handle means on one of said first and second housing parts;

whereby relative axial movement of said first and second housing parts in opposite axial directions by the handle means cams the locking pins together and apart respectively, from an open, gas pedal inserting position, in which the locking pins are cammed apart, permitting the open front end of the housing assembly to be advanced, in enclosing relation, over the gas pedal by the gas pedal passing between and behind the pins and, a closed, gas pedal immobilizing and concealing position in which the pins are cammed together engaging in front of the gas pedal, immobilizing and concealing the gas pedal wholly within the housing assembly; and, means for locking the housing parts in the gas pedal immobilizing and concealing position.

The one housing may be an outer housing and said another housing may be an inner housing.

Preferably, a rear end of the outer housing is closed so that the outer housing forms an open fronted box effectively completely concealing, surrounding and preventing physical access to the gas pedal from all sides and the rear.

It is also preferred that a rear end of the inner housing part is open to enable accommodation of larger/oversized pedals by protrusion therethrough.

According to another aspect of the invention, there is provided a portable, universal, anti-theft device comprising a first, inner, tubular housing part and a second, outer, tubular housing part mounted together in telescopic relation;

each tubular housing part having an open front, axial end and a pair of opposite wall portions extending between front and rear axial ends thereof;

each wall portion of a pair of opposite wall portions of one housing part being formed, with a cam slot which extends axially rearwardly from a peripheral location of the wall portion of the one housing part towards a central location of the wall portion of the one housing part, the cam slots of the one housing part being aligned with each other;

each wall portion of a pair of opposite wall portions of said another housing part being formed, with a cam slot which extends axially rearwardly from a central location of the wall portion of said another one housing part towards a peripheral location of the wall portion of said another housing part, the cam slots of said another housing part being aligned with each other so that the cam slots of the one housing part cross the cam slots of said another housing part;

a cam following locking pin passing through all said slots where they cross;

handle means on one of said housing parts;

whereby relative axial movement of said housing parts in opposite axial directions by the handle means cams the locking pin to a central location of said opposite wall portions and to a peripheral location of said opposite wall portions, respectively, from an open, gas pedal inserting position in which the locking pin is at the peripheral location permitting the open front end of the housing assembly to be advanced, in enclosing relation, over the gas pedal with the gas pedal passing the locking pin and, a closed, gas pedal immobilizing and concealing position in which the locking pin is cammed toward the peripheral location and engages in front of the gas pedal, immobilizing and concealing the gas pedal wholly within the housing assembly; and, means for locking the housing parts in the gas pedal immobilizing and concealing position.

BRIEF DESCRIPTION OF THE DRAWINGS

Specific embodiments of the invention will now be described by way of example only with reference to the accompanying drawings in which:

FIG. 1 is a perspective view of a first embodiment of device according to the invention in a locking position but prior to installation on a gas pedal;

FIG. 2 is a perspective view similar to FIG. 1 but partly exploded and with parts broken away for clarity;

FIG. 3 is a front perspective, partly fragmentary view of the device with a locking shaft omitted from clarity enclosing the gas pedal and pedal shaft but in an unlocked position;

FIG. 4 is a front perspective, similar view to FIG. 3, but with the device in a locked position.

FIG. 5 is a similar view to FIG. 4 of a second embodiment having only a single locking pin in a locked position; and, FIG. 6 is a similar view to FIG. 5 of a third embodiment having only a single locking pin engages the shaft of the gas pedal assembly.

PARTICULAR DESCRIPTION

The first embodiment of portable, universal anti-theft device comprises first, inner, and second outer housing parts 1 and 2, respectively, formed by metal tubes of rectangular cross-section mounted together in telescopic relation. The inner housing part is open ended and the outer housing part is closed at a rear to form a box.

The upper and lower wall portions of the inner housing part 1 are formed with vertically aligned pairs of rearwardly convergent cam slots 18,19 and 20; 21, respectively, while the upper and lower wall portions of the outer housing part 2 are formed with vertically aligned pairs of forwardly convergent cam slots 14,15 and 16,17, respectively, so that first individual slots 18, 20 on one side of the inner housing part 1 cross first individual slots 14,16 on an adjacent side of the outer housing part, and second individual slots 19, 21 on an opposite side of the inner housing part 1 cross second individual slots 15, 17 on an adjacent sides of the outer housing part 2.

First and second cam following, headed locking pins 10 and 11, respectively, pass through individual slots 18, 20 and 14, 16; and through individual slots 19, 21 and 15, 17 where the slots cross. The headed pins 10 and 11 are made of hardened steel and are secured in the slots by caps 12 and 13, respectively, flash welded thereon.

A central portion of an upper wall of the outer housing part 2 is formed with a clearance slot 7 which extends axially rearward and a rear portion of a corresponding wall of the inner housing part 1 is formed with socket forming slot 8 shorter than and aligned under slot 7.

A cylindrical sleeve 3 having an axial access slot 6 is welded to an upper surface of the upper wall of outer housing part 2 with the access slot 6 aligned over upper housing part slot 7 and a locking shaft 5 with a handle at a rear end and an attachment lug 24 depending flag fashion from a front end is slidingly received in the sleeve 3. with the lug keyed into the socket forming slot 8. It will be apparent that movement of the shaft 5 in opposite axial directions will move the inner housing part within the outer housing part in corresponding opposite axial directions.

A conventional locking mechanism 4 has an outer housing welded to an upper surface of the upper wall of the outer housing part 1 over the rear end of sleeve 3 to secure the sleeve to the housing and has a conventional detent ball type, ratcheting latching mechanism to lock the shaft 5 relative to the sleeve 3.

A rectangular window frame 9 is welded around the outer housing part 2 at a front end of the sleeve both to strengthen the housing part 2 and to provide a stand off to assist in guiding the device accurately over a gas pedal.

It will be apparent that relative axial movement of the outer housing and inner housing in opposite axial directions by forward and rearward axial movement of the handle 5 cams the locking pins 10, 11 together and apart respectively, from an open, gas pedal inserting position, shown in FIG. 3, in which the individual locking pins 10,11 are cammed apart by travel in slots 18,20,14,16 and 19,21,15,17, respectively, permitting the housing assembly to be advanced, in enclosing relation, over the gas pedal 23 with the gas pedal 23 passing between and behind the pins 10,11 and, a closed, gas pedal locking position in which the pins 10,11 are cammed together by the slots so as to engage a front of the gas pedal 23 on respective opposite sides of the gas pedal shaft 22 immobilizing and concealing the gas pedal wholly within the housing assembly.

As shown in FIG. 5, in a second embodiment, only a single locking pin is utilized to engage a rear upper edge portion of the pedal of the gas pedal assembly.

In the third embodiment, illustrated in FIG. 6, inclined camming slots are formed in opposite, vertically extending, side walls and incline upward from a bottom wall with only a single horizontally extending locking pin being employed. A retaining plate 25, depends, flange fashion from the front edge of the upper, horizontal wall of the inner tube so that when the pin is cammed upward into engagement with the front of the shaft 22 of the gas pedal assembly and the pedal raised, the rear edge of the pedal will be concealed, aligned behind the retaining plate 25, obviating risk of the locking device being so pulled back off the gas pedal assembly.

It will be appreciated that although the main application of the device of the invention is intended to immobilize and conceal vehicle gas pedals, the invention should not be so limited as the device may often be applied to immobilize and conceal vehicle brake pedals.

The invention claimed is:

1. A portable, universal, anti-theft device comprising a first, inner, tubular housing part and a second, outer, tubular housing part mounted together in telescopic relation;

each tubular housing part having an open front axial end and upper and lower, opposite wall portions extending between front and rear axial ends thereof;

the upper and lower wall portions of one of said first and second housing parts being formed with vertically aligned pairs of rearwardly convergent cam slots;

and the upper and lower wall portions of another of said first and second housing parts being formed with vertically aligned pairs of forwardly convergent cam slots with each pair of slots having a first individual slot and a second individual slot so that first individual slots of both pairs on the one housing part cross first individual slots of both pairs on said another housing part and second individual slots of both pairs of the one housing part cross second individual slots of both pairs on said another housing part;

a first cam following locking pin and a second cam following locking pin passing through all said first individual slots where they cross and all of said second individual slots where they cross;

handle means on one of said first and second housing parts;

whereby relative axial movement of said first and second housing parts in opposite axial directions by the handle means cams the locking pins together and apart respectively, from an open, gas pedal inserting position, in which the locking pins are cammed apart, permitting the open front end of the housing assembly to be advanced, in enclosing relation, over the gas pedal by the gas pedal passing between and behind the pins and, a closed, gas pedal immobilizing and concealing position in which the pins are cammed together engaging in front of the gas pedal, immobilizing and concealing the gas pedal wholly within the housing assembly; and, means for locking the housing parts in the gas pedal immobilizing and concealing position.

2. The device of claim 1 wherein the one housing part is an outer housing part and said another housing is an inner housing.

3. The device of claim 2 wherein a rear end of the outer housing part is closed so that the outer housing part forms a box open at a front.

4. The device of claim 3 wherein a rear end of the inner housing part is open.

5. The device of claim 1 wherein a central portion of an upper wall of the outer housing part is formed with a clearance slot which extends axially rearward and, a rear portion of a corresponding wall of the inner housing part is formed with a socket forming slot shorter than and aligned under the clearance slot, a cylindrical sleeve having an axial sleeve access slot is mounted on an upper surface of the upper wall of the outer housing part with the access slot aligned over the upper housing part access slot and the handle comprises a locking shaft with a handle portion at a rear end and an attachment lug depending flag fashion from a front end is slidingly received in the sleeve with the lug keyed into the socket forming slot whereby movement of the shaft in opposite axial directions moves the inner housing part within the outer housing part in corresponding opposite axial directions and the locking means locks the shaft in a selected axial position in the sleeve thereby to lock the inner housing and the outer housing together with the locking pins in a selected position.

6. A portable, universal, anti-theft device comprising a first, inner, tubular housing part and a second, outer, tubular housing part mounted together in telescopic relation;

each tubular housing part having an open front, axial end and a pair of opposite wall portions extending between front and rear axial ends thereof;

each wall portion of the pair of opposite wall portions of one housing part being formed with a cam slot which extends axially rearwardly from a peripheral location of the wall portion of the one housing part towards a central location of the wall portion of the one housing part, the cam slots of the one housing part being aligned with each other;

each wall portion of the pair of opposite wall portions of said another housing part being formed with a cam slot which extends axially rearwardly from a central location of the wall portion of said another one housing part towards a peripheral location of the wall portion of said another housing part, the cam slots of said another housing part being aligned with each other so that the cam slots of the one housing part cross the cam slots of said another housing part;

a cam following locking pin passing through all said slots where they cross;

handle means on one of said housing parts;

whereby relative axial movement of said housing parts in opposite axial directions by the handle means cams the locking pin to a central location of said opposite wall portions and to a peripheral location of said opposite wall portions, respectively, from an open, gas pedal assembly inserting position in which the locking pin is at the peripheral location permitting the open front end of the housing assembly to be advanced, in enclosing relation, over the gas pedal with the gas pedal assembly passing the locking pin and, a closed, gas pedal assembly immobilizing and concealing position in which the locking pin is cammed toward the peripheral location and engages in front of the gas pedal assembly, immobilizing and concealing the gas pedal wholly within the housing assembly; and, means for locking the housing parts in the gas pedal assembly immobilizing and concealing position.

7. The device of claim 6 wherein the opposite wall portions are vertical and the locking pin extends horizontally, a retaining plate depends from a front end of an upper tube wall portion so that the locking pin passes under the gas pedal assembly when the locking pin is at the peripheral location and is cammed upwards behind the gas pedal aligning a front end of the gas pedal behind the retaining plate into the gas pedal immobilizing position.

8. The device of claim 7 wherein the one housing is an outer housing and said another housing is an inner housing.

9. The device of claim 8 wherein a rear end of the outer housing is closed so that the outer housing forms a box open at a front.

10. The device of claim 9 wherein a rear end of the inner housing part is open.

11. The device of claim 3 wherein a central portion of an upper wall of the outer housing part is formed with a clearance slot which extends axially rearward and, a rear portion of a corresponding wall of the inner housing part is formed with a socket forming slot shorter than and aligned under the clearance slot, a cylindrical sleeve having an axial sleeve access slot is mounted on an upper surface of the upper wall of the outer housing part with the access slot aligned over the upper housing part access slot and the handle comprises a locking shaft with a handle portion at a rear end and an attachment lug depending flag fashion from a front end is slidingly received in the sleeve with the lug keyed into the socket forming slot whereby movement of the shaft in opposite axial directions moves the inner housing part within the outer housing part in corresponding opposite axial directions and the locking means locks the shaft in a selected axial position in the sleeve thereby to lock the inner housing and the outer housing together with the locking pins in a selected position.

* * * * *